United States Patent
Sam et al.

(10) Patent No.: US 9,454,182 B2
(45) Date of Patent: Sep. 27, 2016

(54) FLASH DRIVE

(71) Applicant: PHISON ELECTRONICS CORP., Miaoli (TW)

(72) Inventors: U-Hou Sam, Miaoli (TW); Shu-Min Liu, Taichung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 74 days.

(21) Appl. No.: 14/289,669

(22) Filed: May 29, 2014

(65) Prior Publication Data
US 2015/0296645 A1    Oct. 15, 2015

(30) Foreign Application Priority Data
Apr. 15, 2014   (TW) .............................. 103206529 U

(51) Int. Cl.
*H05K 5/00*     (2006.01)
*G06F 1/16*     (2006.01)

(52) U.S. Cl.
CPC .................................. *G06F 1/1632* (2013.01)

(58) Field of Classification Search
CPC .............. H05K 5/0278; H05K 1/181; H05K 2201/10159; H05K 5/0282; H05K 5/0291; G06K 19/07732; G06K 19/005; G06F 12/0246
See application file for complete search history.

(56) References Cited

U.S. PATENT DOCUMENTS 6,733,329 B2 * 5/2004 Yang ................ G06K 19/07732
                                              439/518
D597,077 S  *  7/2009 Brandenburg ............... D14/217

* cited by examiner

*Primary Examiner* — Robert J Hoffberg
*Assistant Examiner* — Hung Dang
(74) *Attorney, Agent, or Firm* — Jianq Chyun IP Office

(57) ABSTRACT

A flash drive suitable for being electrically connected to an electronic device is provided. The flash drive includes a storage module and a first connector. The storage module is a plate and has a main surface. An area of the main surface is not less than areas of other surfaces of the plate. The first connector stands on the main surface and is electrically connected to the storage module. The first connector is electrically connected to the electronic device along an axis, and the axis is not parallel to the surface.

12 Claims, 12 Drawing Sheets

FLASH DRIVE

CROSS-REFERENCE TO RELATED APPLICATION

This application claims the priority benefit of Taiwan application serial no. 103206529, filed on Apr. 15, 2014. The entirety of the above-mentioned patent application is hereby incorporated by reference herein and made a part of this specification.

FIELD OF THE INVENTION

The invention is directed to a flash drive.

DESCRIPTION OF RELATED ART

With development of multimedia technology, produced digital files become larger in size. Although a conventional 1.44 MB floppy disk is easy to carry, a capacity thereof cannot meet current needs. Moreover, a conventional diskstructure type hard disk can provide a large storage space, but it is inconvenient to carry due to its large size. Recently, with the popularization of universal serial bus (USB) interfaces and the price reduction of flash memories, USB flash disks advantaged in large storage capacity, great compatibility, and portability have been extensively applied to transmit data between various computers and storage devices.

A flash drive featuring in large storage capacity, plug-and-play, compact size and portability has taken the place of the floppy disk. The flash drive is electrically connected to a computer host and a storage device through a connector (e.g., a USB plug or an IEEE 1394 plug) by means of a storage component connected thereto.

However, corresponding to various types of the electronic devices, the flash drive have to be adapted to different connection interfaces. More importantly, the flash drive connected with the electronic device forms a cantilever-like structure, and the connected structure would collide with other objects (including a user) easily, which leads to high risk of damaging the flash drive. Accordingly, how to enhance structure or to reduce the probability for colliding with other objects after the electronic device is connected with the flash drive becomes a subject that the persons of the art have to face to.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is related to a flash drive capable of reducing probability for colliding with an external object due to a structural shape after the flash drive is connected with an electronic device.

The invention provides a flash drive suitable for being electrically connected to an electronic device. The flash drive includes a storage module and a first connector. The storage module is a plate and has a main surface, and an area of the main surface is not less than areas of other surfaces of the plate. The first connector stands on the main surface and is electrically connected to the storage module. The first connector is electrically connected to the electronic device along an axis, and the axis is not parallel to the main surface.

To sum up, with the first connector standing on the main surface of the storage module, the flash drive can be electrically connected with the electronic device through the first connector, where the first connector is connected to the electronic device along an axis, and the axis is not parallel to the main surface of the storage module. Thereby, in the invention, the main surface of the storage module in a plate shape contacts the electronic device with the main surface thereof to avoid forming a cantilever-like protrusion structure, such that the appearance of the flash drive connected with the electronic device can facilitate in reducing probability of collision or damage from the collision.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
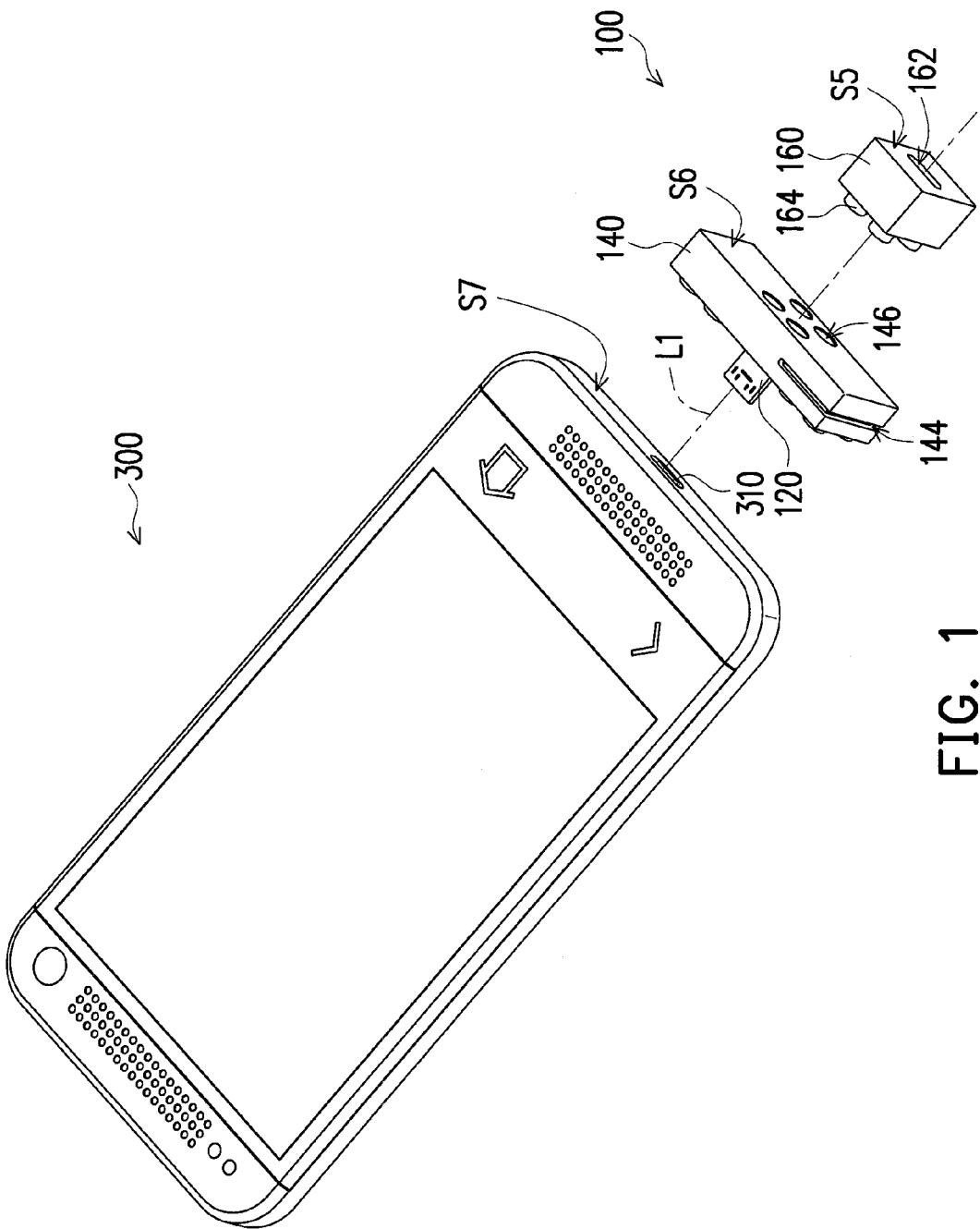
FIG. 1 is a schematic diagram of assembling a flash drive to an electronic device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2:
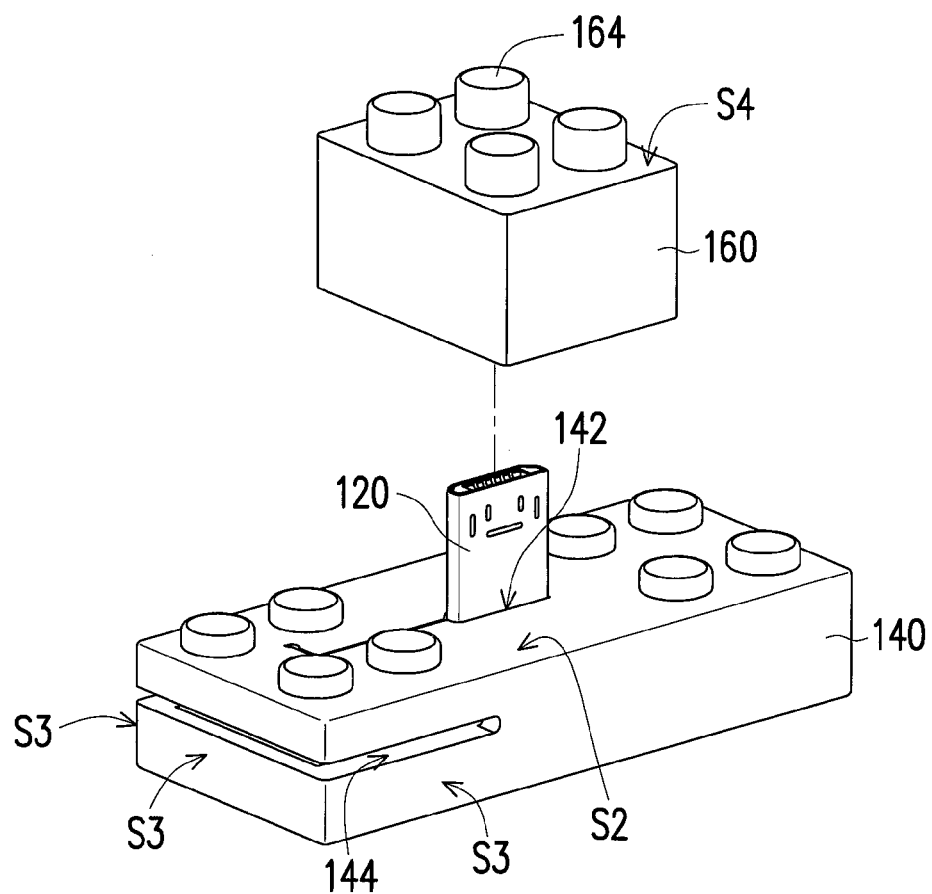
FIG. 2 and FIG. 3 are schematic diagrams illustrating the flash drive of FIG. 1 in other states.
Figure 3:
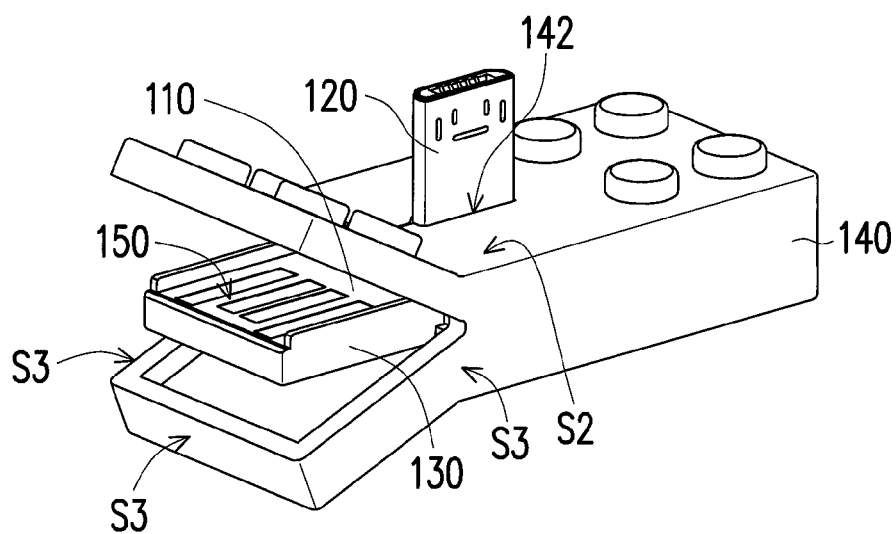
Figure 4:
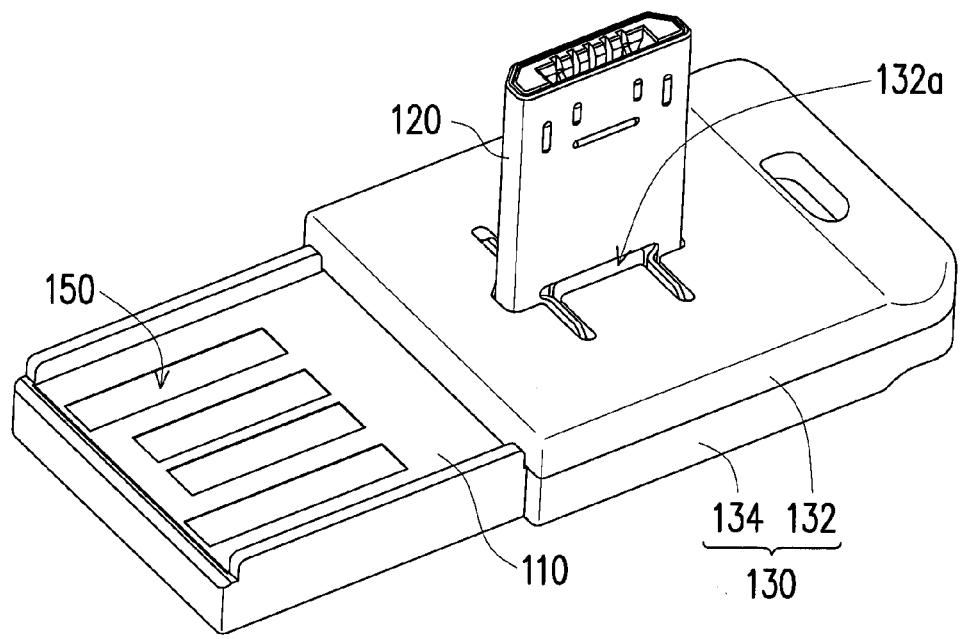
FIG. 4 is a schematic diagram illustrating a portion of components of the flash drive of FIG. 1.
Figure 5:
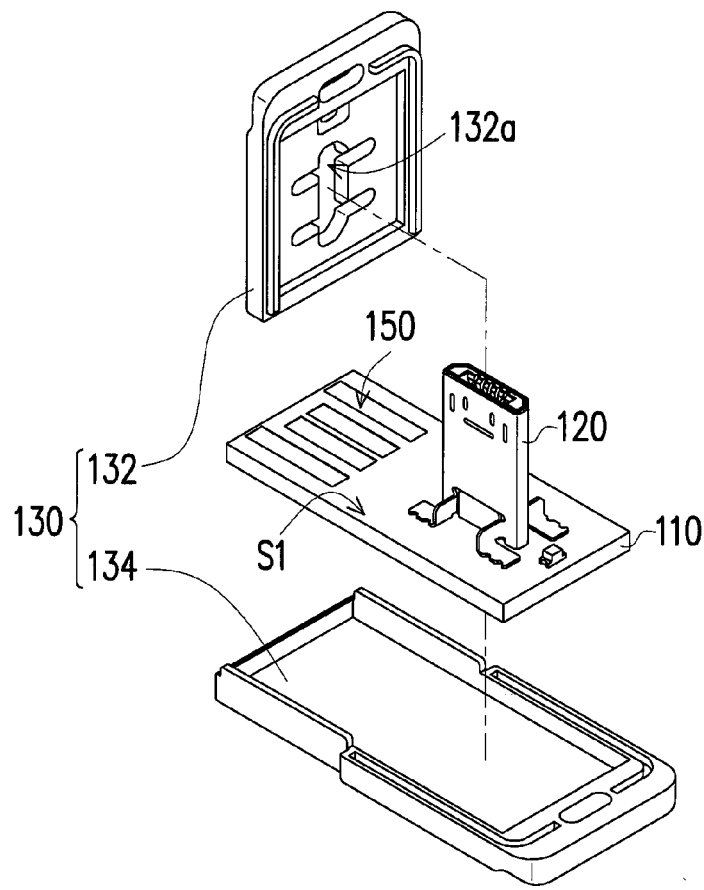
FIG. 5 is an exploded diagram of a portion of components of the flash drive of FIG. 4.

FIG. 1 is a schematic diagram of assembling a flash drive to an electronic device according to an exemplary embodiment of the present invention. FIG. 2 and FIG. 3 are schematic diagrams illustrating the flash drive of FIG. 1 in other states. FIG. 4 is a schematic diagram illustrating a portion of components of the flash drive of FIG. 1. FIG. 5 is an exploded diagram of a portion of components of the flash drive of FIG. 4. First, referring to FIG. 1, a flash drive 100 is suitable for being electrically connected to an electronic device 300 for signal or information transmission. In the present exemplary embodiment of the present invention, the electronic device 300 is illustrated as a portable device as an example, but the invention is not limited thereto.

Then, referring to both FIG. 4 and FIG. 5, in the present exemplary embodiment, the flash drive 100 includes a storage module 110, a first connector 120, a first housing 130 and a second housing 140. The storage module 110 is, for example, a module fabricated by a system in package (SIP) process, namely, a package module formed by a package body including one or more chips where any one or more elements, such as passive elements, capacitors, resistors, connection interfaces, antennas are disposed. Thus, referring to FIG. 5, the storage module 110 is presented in a plate shape and has a main surface S1. In this case, an area of the main surface S1 is not less than areas of other surfaces of the plate. Namely, in the present exemplary embodiment, the main surface S1 refers to the surface having the largest area in the storage module 110. Additionally, the first connector 120 stands on the main surface S1 and is electrically connected to the storage module 110. Referring to FIG. 1, the storage module 110 may be accommodated in a plurality of housings (e.g., a first housing 130 depicted in FIG. 4 and a second housing 140 depicted in FIG. 1 through FIG. 3, which will be described in detail below), and thereafter, the first connector 120 may be electrically connected to (or detached from) the electronic device 300 along an axis L1. The axis L1 is not parallel to the main surface S1 of the storage module 110.

In other words, the first connector 120 is disposed on the main surface S1 of the storage module 110 in the present exemplary embodiment, and in this way, a connection direction of the first connector 120 (which is also an extension direction of the first connector 120), i.e., the axis L1, has an non-zero included angle with the main surface S1. Thereby, when the flash drive 100 is connected to the electronic device 300, a length for the flash drive 100 relatively protruding from a structure formed by the electronic device 300 can be shortened so as to prevent the flash drive 100 from being damaged due to collision or inconsistency in plug directions. On the other hand, according to the structure of the flash drive connected with the electronic device in the current technique, the extension direction of the plate of the flash drive is consistent with the connection direction of the connector, which is equivalent to a state that the connection axis L1 of the flash drive 100 is parallel to the main surface S1 of the storage module 110. Therefore, after being connected, the flash drive 100 relatively protrudes from the structure formed by the electronic device 300 for a greater length, and as a result, the probability that the flash drive is damaged from being collide is higher.

Returning to FIG. 4 and FIG. 5, in the present exemplary embodiment, the first connector 120 is substantially perpendicular to the main surface S1 of the storage module 110, and the first housing 130 is composed of a first member 132 and a second member 134 which are assembled together. Thus, the storage module 110 may be accommodated in the accommodating space between the first member 132 and the second member 134 and may be partially exposed from the first housing 130. It should be noted that the first member 132 has a first opening 132a, and in this way, when the storage module 110 is accommodated in the first housing 130, the first connector 120 may protrude from the first housing 130 through the first opening 132a.

Additionally, the flash drive 100 further includes a second connector 150 which is disposed on the storage module 110, away from the first connector 120 and parallel to the main surface S1. Meanwhile, in the present exemplary embodiment, the second connector 150 is substantially formed by a plurality of terminals on the storage module 110, and the terminals are exposed from the first housing 130. In the present exemplary embodiment, the first connector 120 complies with a micro universal serial bus (Micro-USB) standard, and the second connector 150 complies with a universal serial bus (USB) standard, such that the storage module 110 may be connected with other electronic devices by using different connection interfaces to improve adaptivity of the flash drive 100. However, the invention is not intent to limit the types of the connectors. In another exemplary embodiment that is not shown, the first connector 120 may also comply with the USB standard, while the second connector 150 may also comply with the Micro-USB standard. Moreover, a plurality of terminals or other adaptive transmission interfaces complying with USB 2.0 or USB 3.0 may also be disposed on the storage module 110 for a user's selection.

Additionally, in the first housing 130, an area of the first member 132 is substantially less than an area of the second member 134. In this way, when the storage module 110 is accommodated in the first housing 130, the second connector 150 is exposed from the first housing 130. Namely, an orthogonal projection of the second connector 150 on the second member 134 is located out of a range of an orthogonal projection of the first member 132 on the second member 134. Thereby, the user can directly use the exposed second connector 150 to connect another electronic device through the corresponding connection interface.

Referring to FIG. 2 and FIG. 3 again, in the present exemplary embodiment, after the storage module 110 and the first connector 120 disposed thereon are assembled in the first housing 130, the assembly thereof is inserted in the second housing 140 of the flash drive 100. In this case, the first housing 130 is made of plastic, for example, and the second housing 140 is made of rubber or a flexible and elastic material for protecting the first housing 130 and achieving an appearance effect. The second housing 140 has a second opening 142 located on a top surface S2, and as if the first housing 130 and the storage module 110 accommodated therein are inserted in the second housing 140, the first connector 120 may then protrude from the second housing 140 through the second opening 152, such that the storage module 110 may be electrically connected to a fourth connector 310 of the electronic device 300 through the first connector 120, as shown in FIG. 1.

Additionally, the second housing 140 further has a first split portion 144 which is located on a side face S3 of the second housing 140 and communicates the external environment with the internal space of the second housing 140. In the present exemplary embodiment, the first split portion 144 extends and crosses three side surfaces S3 of the second housing 140, where the three side surfaces S3 are adjacent one by one and respectively neighbor with the top surface S2. Since the second housing 140 is flexible, the user may open the first split portion 144 to form an opening structure on the side surface S3 (as shown in FIG. 3), such that the first housing 130, the storage module 110 and the first connector 120 after being assembled may be moved in or out of the second housing 140 through the first split portion 144.

Besides, referring to FIG. 3, during the assembling process, the second connector 150 of the flash drive 100 is adjacent to the first split portion 144. Thus, when the flash drive 100 is not yet connected to the electronic device 300, the user may exposing the second connector 150 from the second housing 140 by opening the first split portion 144 to form an opening structure. In this way, the flash drive 100 is connected with another electronic device through the second connector 150 for use.

Referring to FIG. 1 and FIG. 2 again, in the present exemplary embodiment, the flash drive 100 further includes a cover body 160 which is made of the same material as the second housing 140. The cover body 160 has a top surface S4 and a bottom surface S5 which are opposite to each other, a containing port 162 located on the bottom surface S5 and a protrusion pillar 164 located on the top surface S4. Relatively, the second housing 140 further has an assembly port 146 located on a bottom surface S6 thereof. In this way, when the flash drive 100 is not in use, the cover body 160 may be assembled to the top surface S2 of the second housing 140, such that the first connector 120 may be inserted in the containing port 162, as shown in FIG. 2 to achieve the protection of the first connector 120.

In addition, when the flash drive 100 is connected to the electronic device 100 and in use, the cover body 160 may be detached from the first connector 120 and assembled to the bottom surface S6 of the second housing 140 by the protrusion pillar 164 together with the assembly port 146. Thereby, the cover body 160 will not get disappeared easily when being detached from the second housing 140. Certainly, patterns and positions of assembling the cover body 160 and the second housing 140 are not limited in the present exemplary embodiment. The user may assemble the structure in the stacking manner which is illustrated in the present exemplary embodiment, or in any other manner, for example, the user may assemble the cover body 160 and the second housing 140 by means of locking attachment or tying attachment, such that the cover body 160 is easy to be retained when being detached from the first connector 120.

Figure 6:
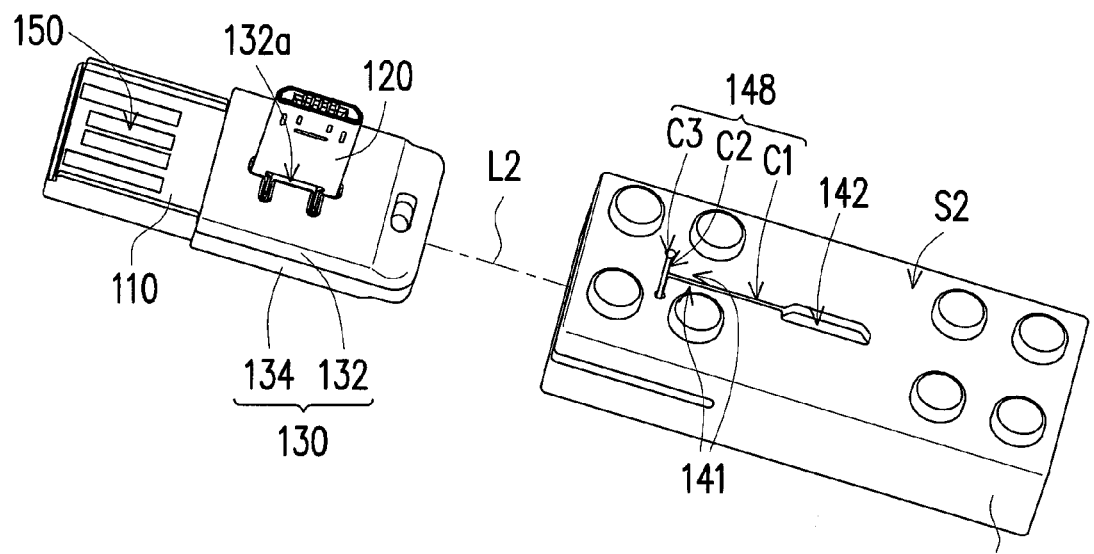
FIG. 6 through FIG. 8 are schematic diagrams illustrating a process of assembling the storage module, the first connector and the first housing to the second housing.
Figure 7:
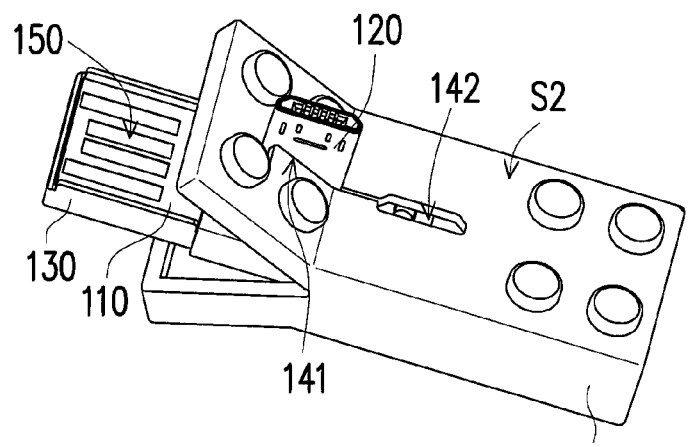
Figure 8:
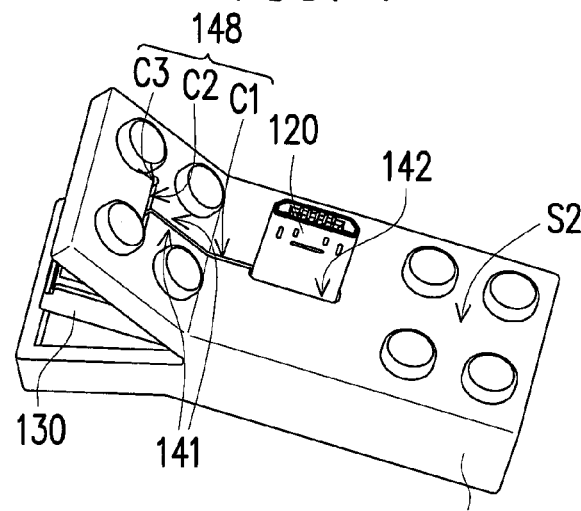

FIG. 6 through FIG. 8 are schematic diagrams illustrating a process of assembling the storage module, the first connector and the first housing to the second housing. Referring to both FIG. 6 and FIG. 8, the second housing 140 is made of, for example, rubber, as described above, and thus, with the flexibility and the elasticity thereof, the aforementioned components may be assembled in the second housing 140 successfully. In the present exemplary embodiment, the second housing 140 further has a second split portion 148 located on the top surface S2, and the top surface S2 includes a first section C1 and a second section C2 which are connected with each other. The first section C1 is parallel to an axis L2, and the storage module 110, the first connector 120 and the first housing 130 are assembled to the second housing 140 along the axis L2. The second opening 142 is located on one end of the first section C1. The second section C2 is connected to the other end of the first section C1 which is away from the second opening 142 and is substantially perpendicular to the first section C1. Accordingly, the second split portion 140 is T-shaped. That is, the second opening 142 is located on a bottom end of the T-shaped second split portion 148. Thereby, a portion 141 of the second housing 140 located on the top surface S2 is easily turned and opened due to the presence of the second split portion 148. Besides, the second split portion 148 further has a circular structure C3 which is located at opposite ends of the second section C2 and used to prevent the second split portion 148 from causing structural damage on the second housing 140 to achieve an effect of crack prevention.

On the other hand, the second housing 140 is flexible, and thus, in another exemplary embodiment that is not shown, the second split portion 148 may extend uniaxially, which is equivalent to the first section C1 only present in the aforementioned embodiment, while the second opening 142 is located on one end of the second split portion 148, such that the first connector 120 may be moved to the second opening 142 along the uniaxially extending second split portion 148.

Based on the aforementioned structure and the material characteristics of the second housing 140, e.g., the opening structure formed by the first split portion 144 shown in FIG. 6 and FIG. 7, when the storage module 110 and the connector 120 are moved into the second housing 140 along with the first housing 130 along the assembly axis L2, the first connector 120 may penetrate the top surface S2 of the second housing 140 through the second opening 148 from the openable portion 141 to form the state that the first section is moved in, as shown in FIG. 7. Next, referring to FIG. 7 and FIG. 8, when the storage module 110 and the connector 120 are completely moved into the second housing 140 together with the first housing 130 along the assembly axis L2, the first connector 120 is moved from the second split portion 148 into the second opening 142 to complete the state that the second housing 140 covers the first housing 130.

Accordingly, with the first connector 120 disposed on the main surface S1 of the storage module 110, the structural length of the flash drive 100 after being assembled to the electronic device 300 can be effectively reduced. Nevertheless, the invention is not intent to limit the type that the first connector 120 is disposed on the main surface S1 nor the type of the second housing. Similar to the exemplary embodiments illustrated in FIG. 1 through FIG. 8, the first connector 120 is substantially perpendicular to the main surface S1 of the storage module 110, and when the flash drive 100 is assembled to the electronic device 300 after the second housing 140 covers the first housing 130, the top surface S2 of the second housing 140 substantially contacts a side surface S7 of the electronic device 300.

Figure 9:
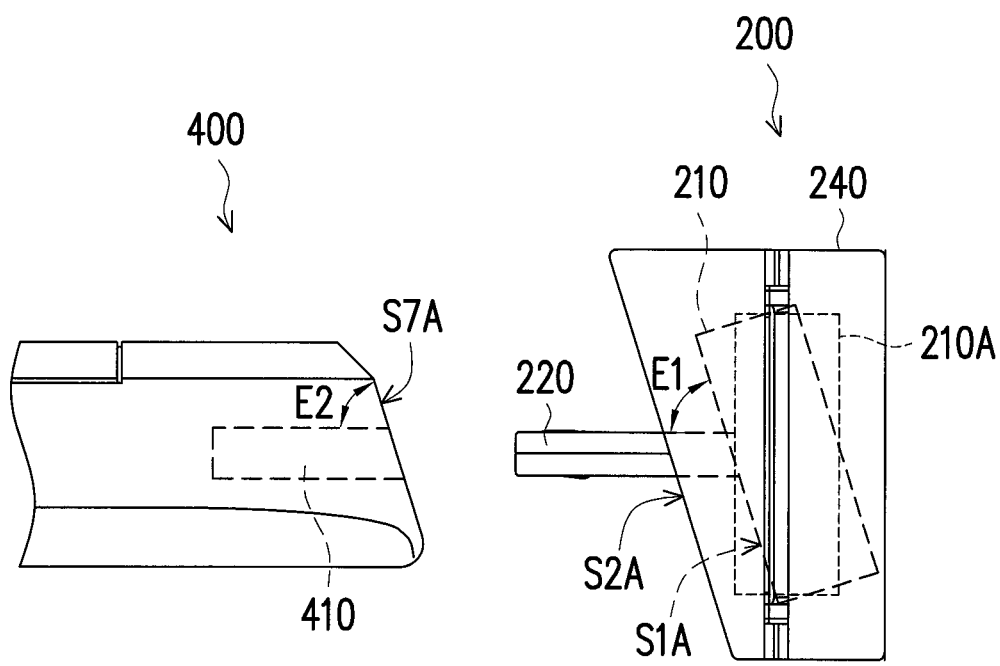
FIG. 9 is a schematic diagram of assembling a flash drive to an electronic device according to another exemplary embodiment of the present invention.

FIG. 9 is a schematic diagram of assembling a flash drive to an electronic device according to another exemplary embodiment of the present invention. Herein, only a portion of the structure is illustrated for example, and storage modules of different embodiments are presented by using different contour lines. A first connector 220 of a flash drive 200 obliquely stands on a main surface S1A of a storage module 210, and a top surface S2A of a second housing 240 is oblique. The main surface S1A is parallel to the top surface S2A. Furthermore, an included angle E1 is formed between the first connector 220 and the main surface S1A or the top surface S2A.

Correspondingly, in the present exemplary embodiment, an included angle E2 is also formed between a side surface S7A of an electronic device 400 and a fourth connector 410, and the included angle E1 is equal to the included angle E2. In other words, after the flash drive 200 is connected to the electronic device 400, the top surface S2A of the second housing 240 of the flash drive 200 contacts the side surface S7A of the electronic device 400, and thereby, the structure strength of the assembled components can be enhanced. A storage module 210A illustrated by using another kind of contour line is perpendicular to the first connector 220 in the same way as the embodiment above and also covered by the second housing 240 with the oblique top surface S2A. In this way, the flash drive 200 may also contact the electronic device 400 with the surfaces in the same obliquity degree. In another exemplary embodiment that is not shown, the flash drive 100 illustrated with reference to FIG. 1 through FIG. 8 may also be connected to the electronic device 400 illustrated in FIG. 9. Accordingly, it is apparent that the invention does not limit the relative angle (or the included angle) between the first connector and the second housing or the storage module. Namely, with the first connector standing on the main surface of the storage module and appropriately carried or covered by the first housing and the second housing, the expected effect of the invention can be achieved.

Figure 10:
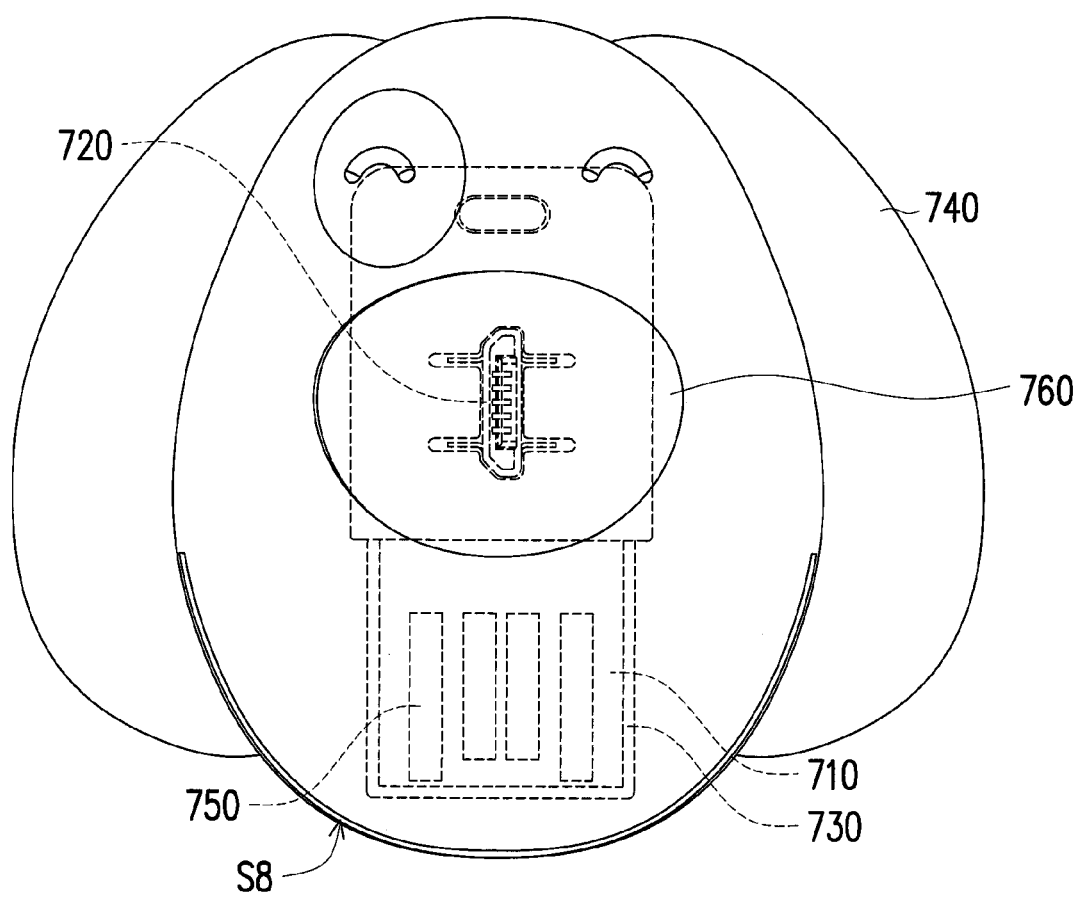
FIG. 10 through FIG. 12 are diagrams in three viewpoints of a flash drive according to another exemplary embodiment of the present invention.
Figure 11:
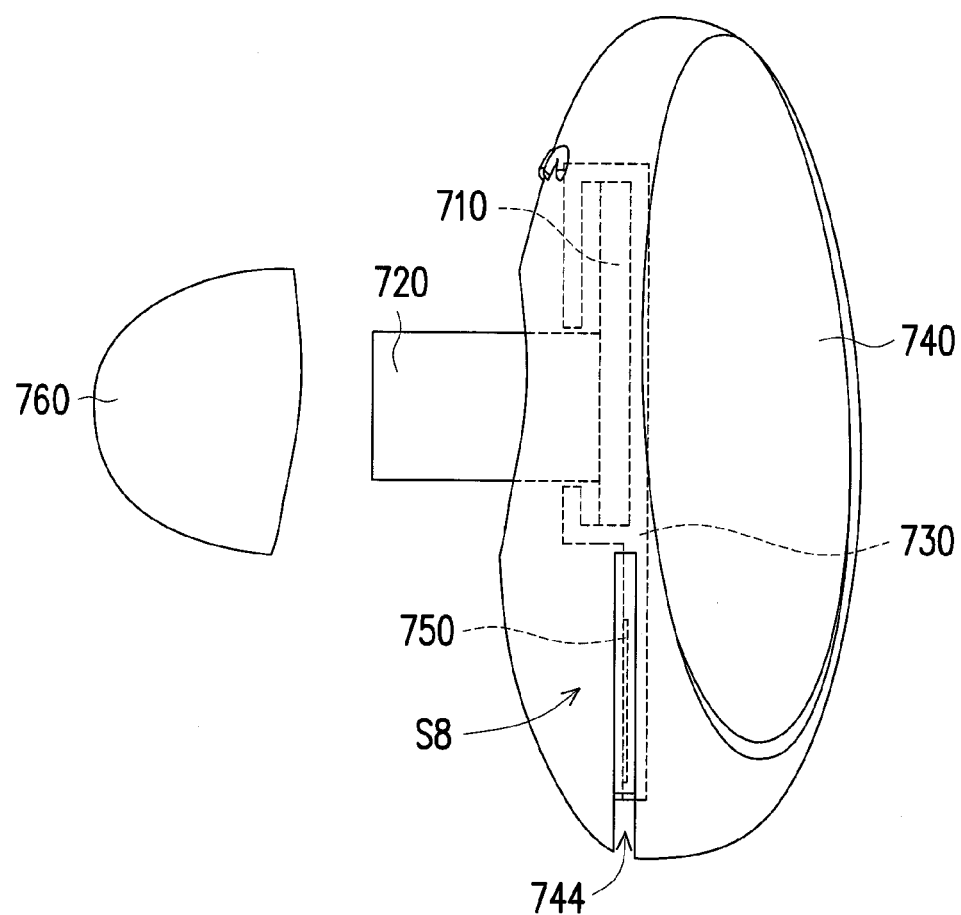
Figure 12:
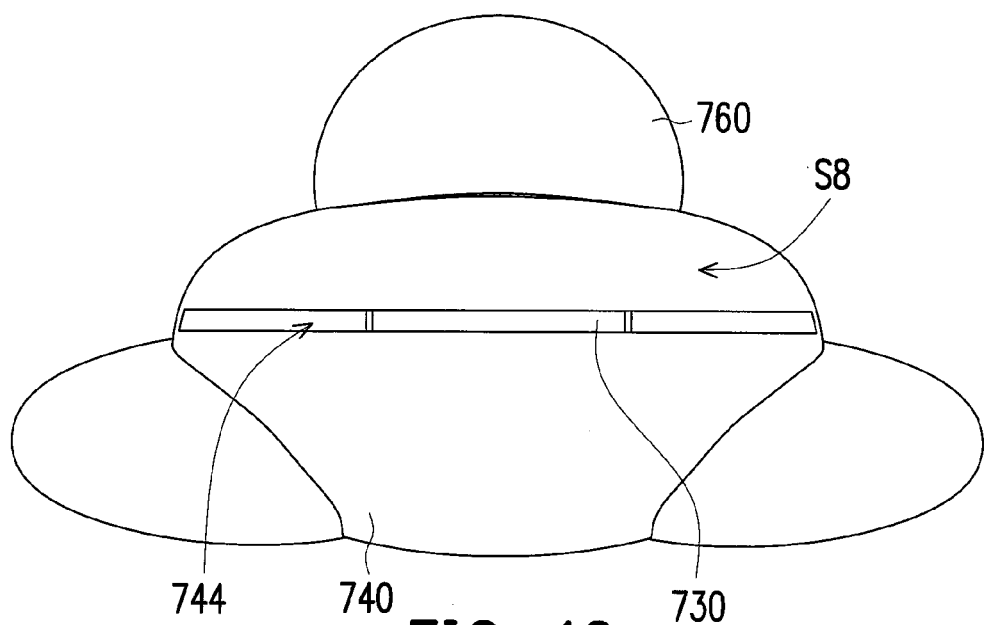

FIG. 10 through FIG. 12 are diagrams in three viewpoints of a flash drive according to another exemplary embodiment of the present invention. Differing from the preceding embodiment, in the present exemplary embodiment, a second housing 740 of a flash drive 700 is molded in a dog head style, and in this way, not only the storage module 710 therein and a first housing 730 can be protected, but also a better appearance can be provided. In the same way as the aforementioned exemplary embodiments, the first connector 720 of the flash drive 700 penetrates the second housing 740 and protrudes therefrom. Moreover, a cover body 760 may have a style design matching the second housing 740. Namely, as shown in FIG. 10 through FIG. 12, the cover body 760 of the present exemplary embodiment has an appearance like a dog nose, which is used to cover the first connector 720 when not in use. Meanwhile, the cover body 740 and the second housing 740 together form the appearance style of the flash drive 740.

Moreover, in the present exemplary embodiment, a first split portion 744 extends on a side surface S8 of the second housing 740. The side surface S8 is substantially an arc surface and different from the three side surfaces S3 which are adjacent one by one in the aforementioned exemplary embodiments.

Figure 13:
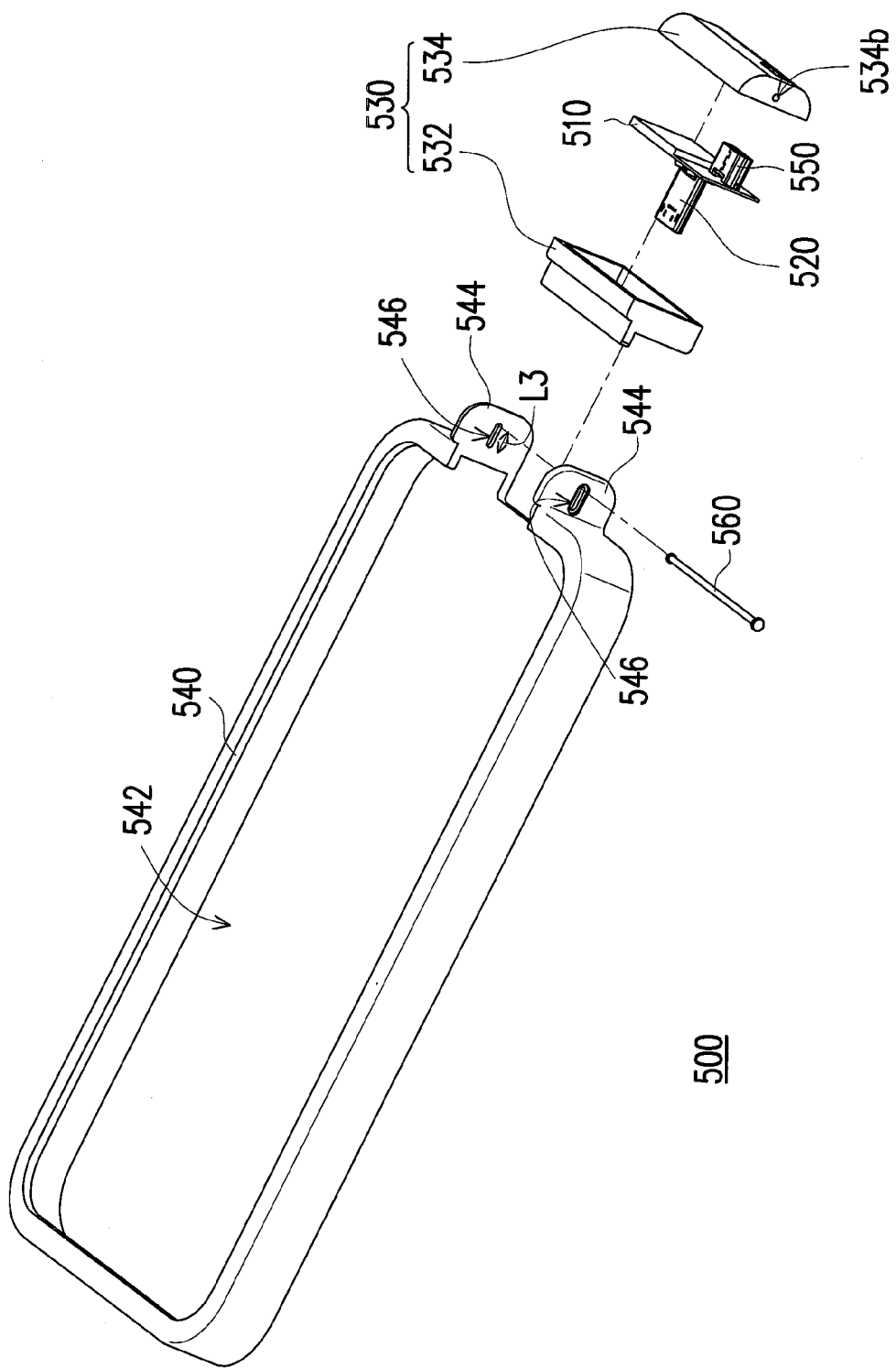
FIG. 13 is an exploded view of a flash drive according to another exemplary embodiment of the invention.
Figure 14:
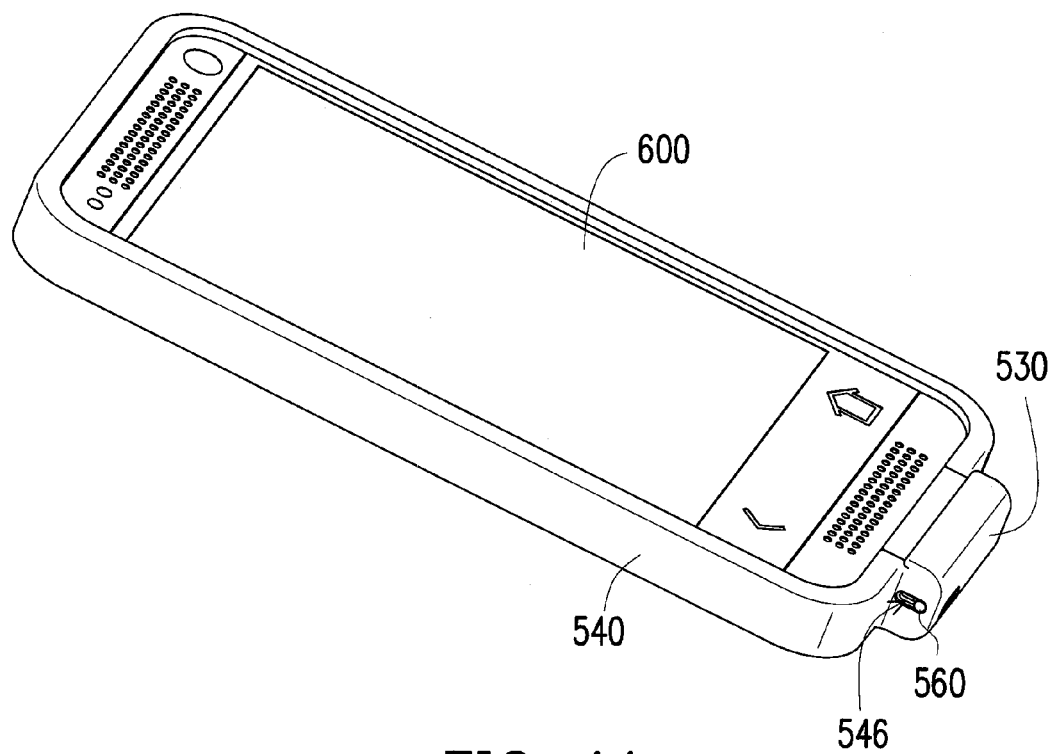
FIG. 14 is a schematic diagram illustrating an assembly of the flash drive of FIG. 13 and an electronic device.

FIG. 13 is an exploded view of a flash drive according to another exemplary embodiment of the invention. FIG. 14 is a schematic diagram of assembling the flash drive of FIG. 13 and an electronic device. Referring to both FIG. 13 and FIG. 14, in the present embodiment, a flash drive 500 includes a storage module 510, a first connector 520, a third connector 550, a third housing 530, and a fourth housing 540. The storage module 510 is also an SIP module as the aforementioned storage module 110 in the same way. The third housing 530 is constructed by butting a third member 532 and a fourth member 534, and an accommodating space formed by the third member 532 and the fourth member 534 accommodates the storage module 510. Referring to FIG. 13, after the third housing 530 is pivoted to the fourth housing 540, the storage module 510, the first connector 520 and the third connector 550 inside the third housing 530 may pivotally rotate relatively to the fourth housing 540, and when an electronic device 600 is assembled to a containing slot 542 of the fourth housing 540, the flash drive 500 can be electrically connected with the electronic device 600 through the first connector 520.

Figure 15:
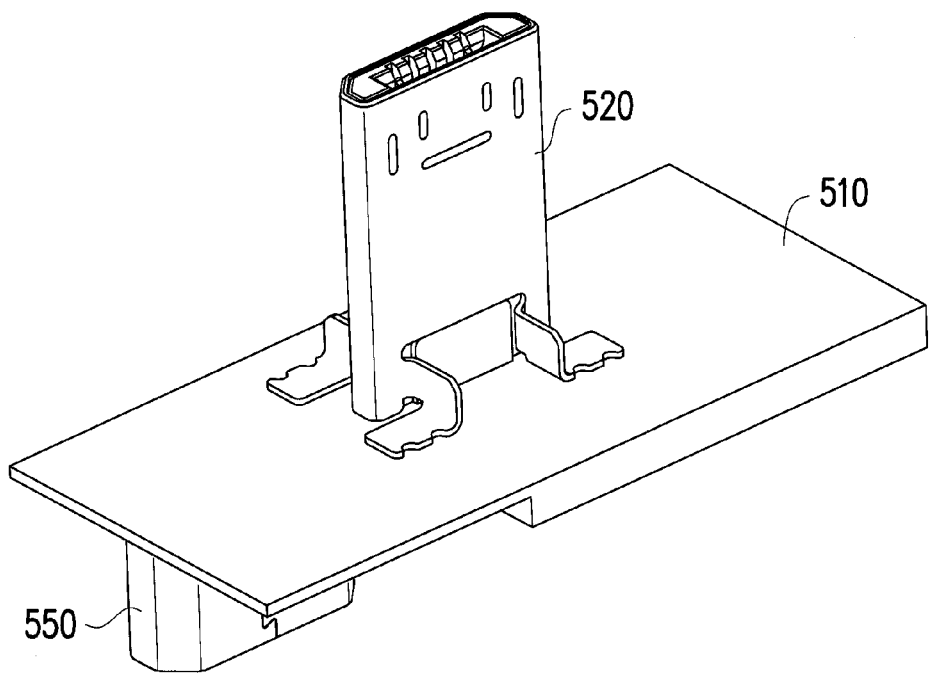
FIG. 15 is a schematic diagram illustrating a portion of components of the flash drive of FIG. 13.
Figure 16:
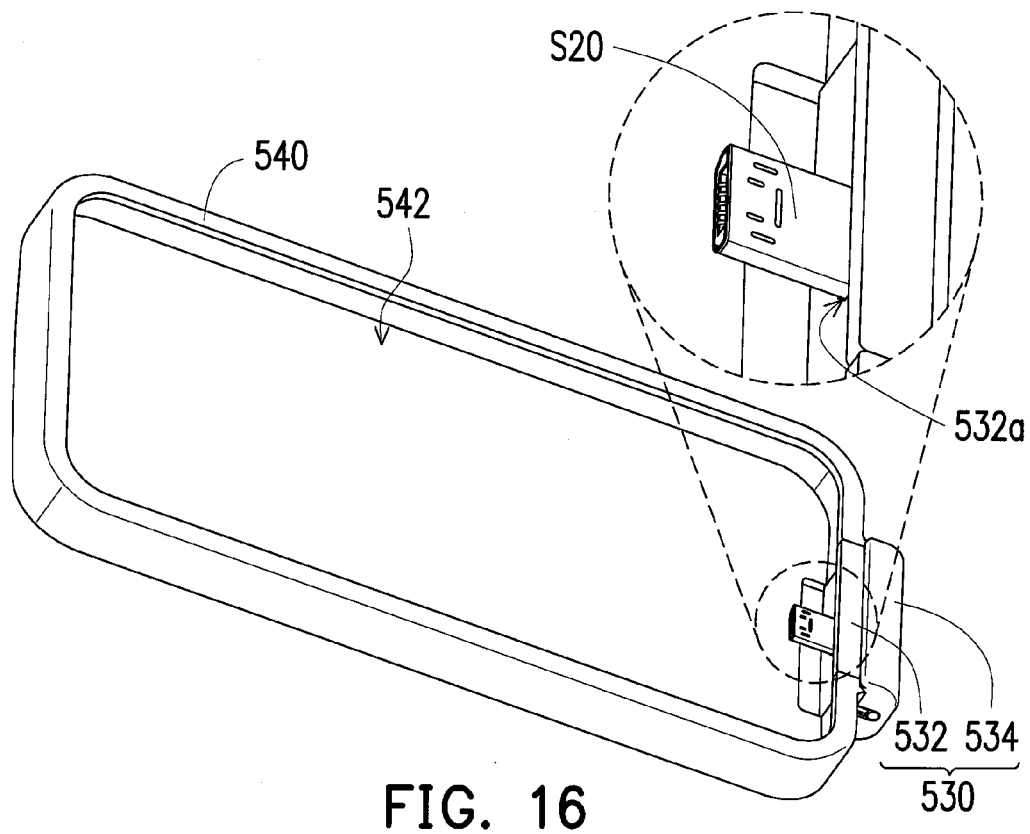
FIG. 16 and FIG. 17 are schematic diagrams in different viewing angles respectively illustrating the flash drive after being assembled.
Figure 17:
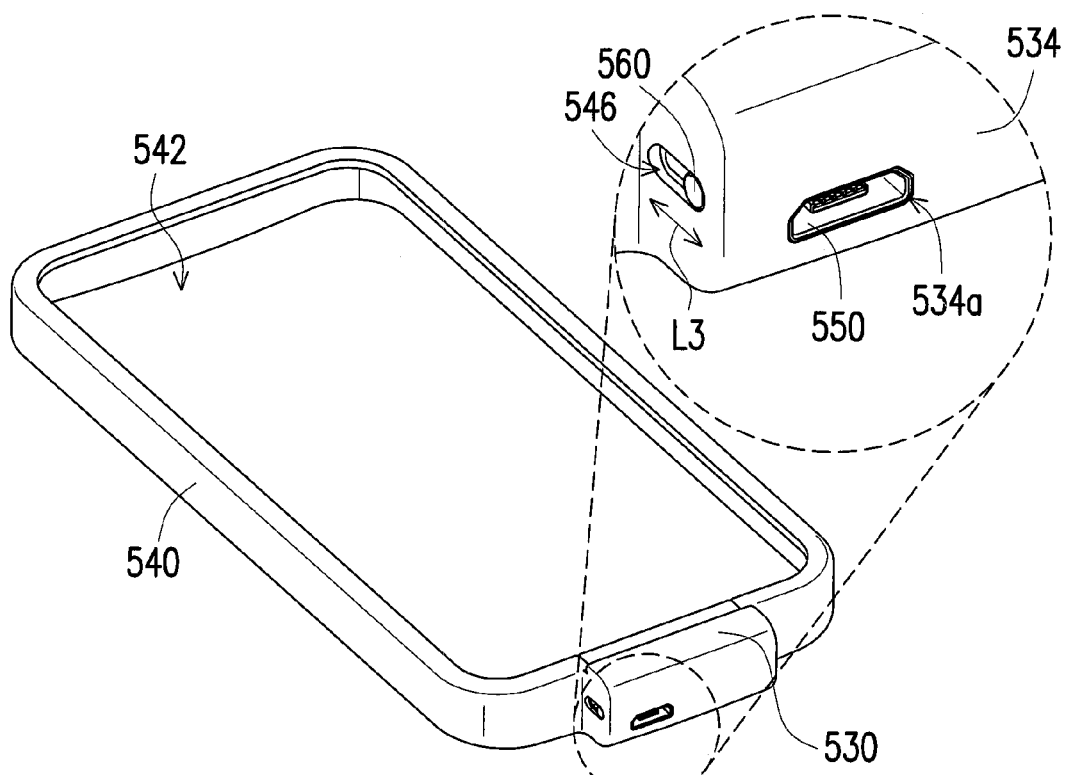

FIG. 15 is a schematic diagram illustrating a portion of components of the flash drive of FIG. 13. FIGS. 16 and 17 are schematic diagrams in different viewing angles respectively illustrating the flash drive after being assembled. Referring to FIG. 15 to FIG. 17, it should be noted that the third connector 550 of the flash drive 500 of the present exemplary embodiment stands on the storage module 510, and the first connector 520 and the third connector 550 are located on different surfaces of the storage module 510 to be electrically connected with each other through the storage module 510. Additionally, the first connector 520 is a plug complying with the Micro-USB standard, for example, and the third connector 550 is a socket complying with the Micro-USB standard, such that the storage module 510 may be electrically connected or transmit information with different electronic devices respectively through the first connector 520 and the third connector 550. For example, the storage module 510 may be electrically connected with a portable electronic device through the first connector 520 for information transmission while being connected with a charging device through the third connector 550 for supplying power.

Additionally, in the third housing 530 of the present exemplary embodiment, the third member 532 has a third opening 532a, the fourth member 534 has a fourth opening 534a, a contour of the third opening 532a matches a cross-sectional contour of the first connector 520, and a contour of the fourth opening 534a matches a cross-sectional contour of the third connector 550. Accordingly, when the storage module 510, the first connector 520 and the third connector 550 are disposed in the third housing 530, the first connector 520 penetrates the third opening 532a and protrudes therefrom, and the third connector 550 is exposed from the third housing 530 through the fourth opening 534a, such that the flash drive 500 can be electrically connected with other electronic devices through the first connector 520 and the third connector 550.

Figure 18:
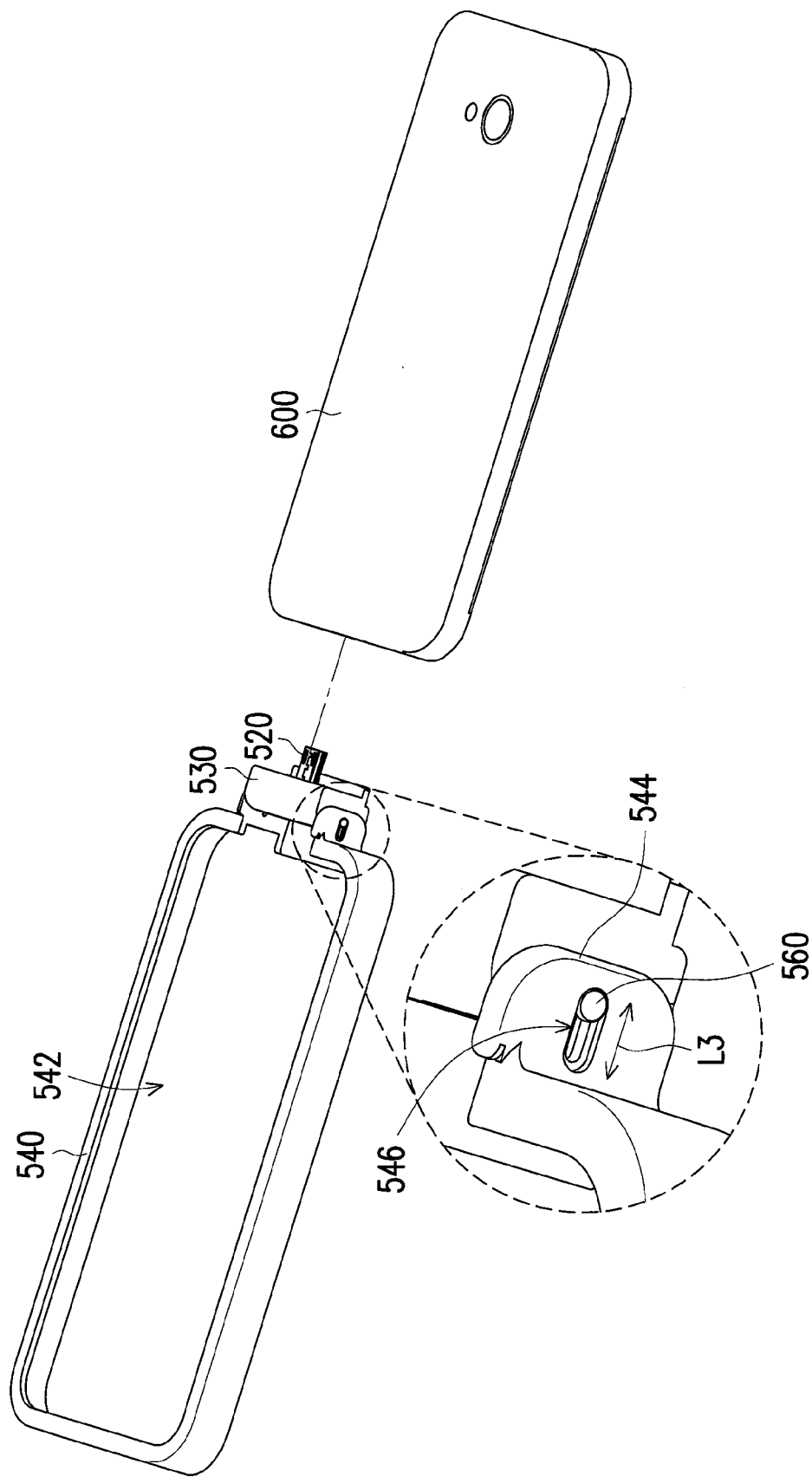
FIG. 18 and FIG. 19 are schematic diagrams illustrating assemblies of the flash drive and the electronic device.
Figure 19:
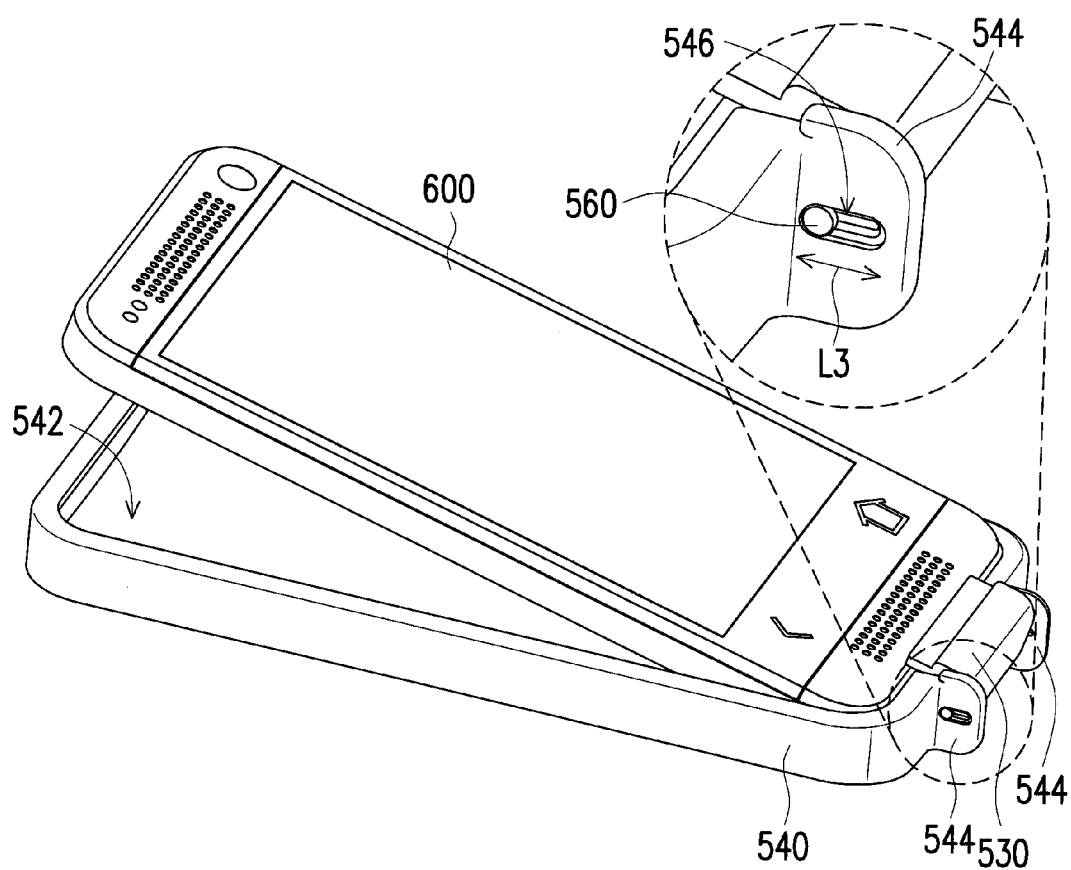

FIG. 18 and FIG. 19 are schematic diagrams illustrating assemblies of the flash drive and the electronic device. Referring to FIG. 13, FIG. 14, FIG. 18 and FIG. 19, further to the above description, the third housing 530 is pivoted to the fourth housing 540 and located on one end of the containing slot 542. Referring to FIG. 10, the flash drive 500 further includes a pivot 560 passing through opening holes 546 on a pair protrusion portions 544 of the fourth housing 540 and also through a pair of through holes 534b (which only one of them is illustrated in FIG. 13) on the fourth member 534 of the third housing 530. Thereby, the storage module 510, the first connector 520 and the third connector 550 inside the third housing 530 may pivotally rotate with the third housing 530 around the pivot 560 and relatively to the fourth housing 540. Herein, FIG. 16 and FIG. 18 illustrate different states of other components related to the third housing 530 due to the rotation thereof.

In a scenario where the user is about to connect the electronic device 600 to the flash drive 500, with reference to FIG. 18, FIG. 19 and FIG. 14 sequentially, the third housing 530 is rotated, such that the first connector 520 departs away from the containing slot 542 of the fourth housing 540, and then, a connector (which is not shown and may refer to FIG. 1) located at one side of the electronic device 600 may be butted to the first connector 520. Thereafter, the electronic device 600 and the third housing 530 (together with the storage module 510, the first connector 520 and the third connector 550 therein) may pivotally rotate around the pivot 560 until the electronic device 600 is assembled into the containing slot 542.

It should be noted that the opening holes 546 located on the protrusion portions 544 may be moved back and forth along an axis L3, and thus, after the electronic device 600 is connected to the first connector 520, it is not necessary to concern the occurrence of displacement of the containing slot 542 due to structural error. In other words, referring to FIG. 18, when the electronic device 600 is butted to the first connector 520, the pivot 560 is located at one of the opening holes 546 which is away from the containing slot 542. Meanwhile, referring to FIG. 18, when the electronic device 600 rotates around the pivot 560, the pivot 560 is located at the other one of the opening holes 546 which is adjacent to the containing slot 542. Finally, referring to FIG. 14, after the electronic device 600 is assembled into the containing slot 542, the pivot 560 is moved back to one of the opening holes 546 which is away from the containing slot 542. Thereby, since the pivot 560 may provide the opening holes 546 with assembly flexibility for moving along the axis L3, the user can assemble the electronic device 600 into the containing slot 542 successfully. In this way, the flash drive 500 can not only be electrically connected with the electronic device 600 through the first connector 520, but also provide the space for carrying and accommodating the electronic device 600 by using the fourth housing 540 thereof, such that the connected electronic device and flash drive can be considered as an integrated structure having a round structure (i.e., without producing the cantilever-like protrusion structure) to achieve effects of protection and reducing collision.

To conclude, in the exemplary embodiments of the present invention, with the first connector standing on the main surface of the storage module, the flash drive can be electrically connected with the electronic device through the first connector, where the first connector is connected to the electronic device along an axis, and the axis is not parallel to the main surface of the storage module. Thereby, in the invention, the main surface of the storage module in the plate shape contacts the electronic device to avoid forming a cantilever-like protrusion structure, such that the appearance of the flash drive connected with the electronic device can facilitate in reducing probability of collision or damage from the collision.

Furthermore, in the structure of the flash drive, the third housing is pivoted to one end of the fourth housing, while the storage module, the first connector and the third connector are accommodated in the third housing, and the fourth housing has a containing slot for accommodating the electronic device. Thereby, the user can first assemble the electronic device to the first connector of the flash drive and then, insert the connected electronic device and flash drive into the containing slot along with the third housing pivotally rotating relatively to the fourth housing, such that the electronic device and the flash drive together form an integrated structure, and in the scenario where the flash drive is electrically connected with the electronic device, the fourth housing 540 provides the electronic device with protection and a better effect of appearance structure. The previously described exemplary embodiments of the present invention have the advantages aforementioned, wherein the advantages aforementioned not required in all versions of the invention. Thought the previously described exemplary embodiments of the present invention have many advantages, the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash drive, suitable for being electrically connected to an electronic device, comprising:
    a storage module, being a plate and having a main surface, a first connector and a second connector, wherein the first connector standing on the main surface along an axis is electrically connected to the storage module and is configured to be electrically connected to the electronic device along the axis, and the axis is not parallel to the main surface, wherein the second connector is disposed on the storage module and electrically connected to the storage module; and
    a first housing, having a first opening, wherein the first housing comprises a first member and a second member which are assembled together, the storage module is located between the first member and the second member, the first member has the first opening, the second connector is formed by a plurality of terminals, and an orthogonal projection of the second connector on the second member is located in the external of an orthogonal projection of the first member on the second member, such that the terminals are exposed from the first housing.

2. The flash drive according to claim 1, wherein the first connector is disposed perpendicularly to the main surface of the storage module.

3. The flash drive according to claim 1, wherein the second connector is away from the first connector and parallel to the main surface.

4. The flash drive according to claim 3,
    wherein the storage module is accommodated in the first housing, the first connector protrudes from the first housing through the first opening, and the second connector is located on an external of the first housing.

5. The flash drive according to claim 4, further comprising:
    a second housing, having a second opening, the storage module and the first housing are accommodated in the second housing, and the first connector protrudes from the second housing through the second opening.

6. The flash drive according to claim 5, wherein the second housing further has a first split portion, and the storage module and the first housing are moved in or out of the second housing through the first split portion.

7. The flash drive according to claim 5, wherein the second housing is flexible.

8. The flash drive according to claim 5, wherein the second housing further has a second split portion, the second split portion extends uniaxially, and the second opening is located on one end of the second split portion.

9. The flash drive according to claim 5, wherein the second housing further has a second split portion, the second split portion is T-shaped and the second opening is located on a bottom end of the T shape.

10. The flash drive according to claim 5, suitable for being detachably assembled to the electronic device and comprising a cover body, wherein when the flash drive is not assembled to the electronic device, the cover body is detachably assembled to the second housing to cover and accommodate the first connector, and when the flash drive is assembled to the electronic device, the cover body is moved away from the first connector and assembled to other part of the second housing.

11. A flash drive, suitable for being electrically connected to an electronic device, comprising:

a storage module, being a plate and having a main surface, a first connector and a second connector, wherein the first connector standing on the main surface along an axis is electrically connected to the storage module and is configured to be electrically connected to the electronic device along the axis, and the axis is not parallel to the main surface, wherein the second connector is disposed on the storage module and electrically connected to the storage module;

a third connector, standing on the storage module, and the first connector and the third connector are located on different surfaces of the storage module;

a third housing, having a third opening and a fourth opening which are located on different surfaces, wherein the storage module is accommodated in the third housing, the first connector protrudes from the third housing through the third opening, and the third connector is exposed from the third housing through the fourth opening; and a fourth housing, having a containing slot, wherein the third housing is pivoted to the fourth housing and located on one end of the containing slot, and after being electrically connected to the first connector, the electronic device is moved in or out of the containing slot along with the third housing rotating relatively to the fourth housing.

12. The flash drive according to claim 11, wherein the first connector is a plug, and the third connector is a socket.

\* \* \* \* \*